(12) United States Patent
Chen et al.

(10) Patent No.: US 12,192,347 B2
(45) Date of Patent: Jan. 7, 2025

(54) PUBLIC RANDOM NUMBER GENERATION METHOD AND DEVICE BASED ON BLOCKCHAIN

(71) Applicants: THE BLOCKHOUSE TECHNOLOGY LIMITED, Oxfordshire (GB); Bangdao Chen, Shenzhen (CN)

(72) Inventors: Bangdao Chen, Shenzhen (CN); Andrew William Roscoe, Oxfordshire (GB)

(73) Assignee: THE BLOCKHOUSE TECHNOLOGY LIMITED, Oxfordshire (GB)

( * ) Notice: Subject to any disclaimer, the term of this patent is extended or adjusted under 35 U.S.C. 154(b) by 238 days.

(21) Appl. No.: 17/917,000

(22) PCT Filed: Apr. 8, 2021

(86) PCT No.: PCT/CN2021/085887
§ 371 (c)(1),
(2) Date: Oct. 5, 2022

(87) PCT Pub. No.: WO2021/204180
PCT Pub. Date: Oct. 14, 2021

(65) Prior Publication Data
US 2023/0163961 A1 May 25, 2023

(30) Foreign Application Priority Data
Apr. 9, 2020 (CN) .......................... 202010275726.1

(51) Int. Cl.
*H04L 9/08* (2006.01)
*G06F 7/58* (2006.01)
*H04L 9/00* (2022.01)

(52) U.S. Cl.
CPC ............ *H04L 9/0869* (2013.01); *G06F 7/582* (2013.01); *H04L 9/50* (2022.05)

(58) Field of Classification Search
CPC ......... H04L 9/0869; H04L 9/50; G06F 7/582; G06F 21/602
See application file for complete search history.

(56) References Cited

U.S. PATENT DOCUMENTS

2020/0213106 A1 * 7/2020 Kang .................... H04L 9/0643

FOREIGN PATENT DOCUMENTS

| CN | 109039648 A | * 12/2018 | ............. G06Q 40/04 |
| CN | 109327311 A | 2/2019 | |

(Continued)

*Primary Examiner* — Nelson S. Giddins
(74) *Attorney, Agent, or Firm* — SOROKER AGMON NORDMAN PTE LTD

(57) ABSTRACT

Disclosed is a public random number generation method based on a blockchain, including: selecting a node group G containing N trusted nodes; determining a first time point $t_m$ and a second time point $t_n$ respectively for generating an m-th/n-th block, wherein the former is earlier, and the m-th block is fixed and cannot be tampered at $t_n$; at the first time point $t_m$, enabling each of the N trusted nodes to separately generate a sub-random number $r_j$ as a component forming a random number X, wherein j=1, 2, ..., N, on which delayed encryption is performed, with corresponding results placed in the m-th block; and at the second time point $t_n$, decrypting the delayed encryption results to obtain decrypted data of them all that are all of sub-random number $r_j$, on which operation is performed to obtain the random number X as a final available public random number.

18 Claims, 3 Drawing Sheets

(56) References Cited

FOREIGN PATENT DOCUMENTS

| CN | 110865793 A | * | 3/2020 | ........... G06F 21/602 |
| CN | 111488134 A |   | 8/2020 | |

* cited by examiner

PUBLIC RANDOM NUMBER GENERATION METHOD AND DEVICE BASED ON BLOCKCHAIN

TECHNICAL FIELD

The present invention generally relates to the technical field of blockchain, and in particular to a public random number generation method and device based on blockchain.

BACKGROUND OF THE INVENTION

Random oracle machine was proposed by Bellare and Rogaway in 1993. A random oracle R is a set of all random mappings from $\{0, 1\}^*$ to $\{0, 1\}\infty$. That is, for any $R \in R$, it is satisfied that for any input x, each bit of $R(x)$ is randomly chosen and uncorrelated. Among the above, $\{0, 1\}^*$ represents a set of binary sequences of a finite length, and $\{0, 1\}\infty$ represents a set of binary sequences of an infinite length. It is a definite, publicly accessible, random uniform distribution function. For an input of any length, uniform selection of a value of a definite length in the output domain as an answer to a query, corresponds to adding a publicly accessible random oracle machine to the standard model. Since the proof process of cryptographic security involves complex mathematical operations, while the process is error-prone and its correctness is not easy to be verified, an important application of the random oracle machine relates to such proof. A formal random oracle machine is formed by a theorem prover, which makes the proof easier and facilitates the verification of correctness of proof.

For the same input, the oracle machine uses the same method for output each time. The oracle machine forms a bridge between the real world and the blockchain by providing data to smart contracts. The random oracle machine is a function that randomly maps all possible inputs and outputs. Any finite function is not a random oracle function because a random oracle machine is defined to be an infinite function. In fact, some intentionally designed signature and encryption methods have been proven to be more secure if a random oracle machine is used, while there will be obvious insecurity if other functions are used instead of the random oracle machine. In addition, for any rather natural security agreement, the proof of its security by the random oracle machine strongly evidencing the practical reliability of the agreement. Specifically, if a practice is proven to be secure, then an attack of the practice must break the assumption of the proof. For example, if the security proof of an encryption algorithm, such as the RSA algorithm, is based on the difficulty of prime factorization, the method of breaking the proof is to find a fast prime factorization algorithm. Breaking the assumption of the random oracle machine, however, requires to find where the actual hash function differs from the random oracle machine in unknown and bad ways. For a better hash function SHA-3 that is generally considered to be free of such weakness, the relevant protocol may be proven to be secure.

In the case that a de-centralised system determines the outcome of competition by determining bookkeeping power, the prior art generally employs a mechanism based on "Proof of Work (PoW)", that is, PoW is a proof confirming that the working end has done a certain amount of work. The main characteristic of PoW is the asymmetry of computation, that is, the working end needs to do some difficult work to get a result, but the verifier can easily check whether the working end has done corresponding works through the result. However, PoW obviously has the disadvantage of wasting computing resources, and does not form a mature random number generation method based on the random oracle machine, so as to generate a next block of the blockchain in the blockchain generation and growth processes, and to select who is the generator of the next block.

SUMMARY OF THE INVENTION

In view of the above technical problems, the present disclosure proposes a public random number generation method based on a blockchain. By this method, an unbiased random number table can be created during the blockchain evolution, which (for example, as generated every minute) can be set in advance. For example, it is set in the Genesis block, i.e., the first block in the blockchain, which is set in the current version of Bitcoin client to be 0, and set in the previous version to be 1. The Genesis block is typically placed in the annotations of the code, wherein a first code segment defines all the variables needed to create the block, and the second code segment is of a standard block class format and contains the shortened version of the data in the first code segment.

In one aspect of the present disclosure, provided is a public random number generation method based on a blockchain, comprising the steps of: S101, selecting a node group G, wherein the node group G contains N trusted nodes; S102, determining a first time point $t_m$ and a second time point $t_n$, wherein the first time point $t_m$ is earlier than the second time point $t_n$, the first time point $t_m$ is a generation time point of an m-th block, the second time point $t_n$ is a generation time point of an n-th block, and the m-th block is fixed and cannot be tampered at the second time point $t_n$; S103, at the first time point $t_m$, enabling each of the N trusted nodes to separately generate a sub-random number $r_j$, wherein j=1, 2, . . . , N, performing delayed encryption on the sub-random number $r_j$, and placing delayed encryption results in the m-th block, wherein the sub-random number $r_j$ is a component forming a random number X, and the delayed encryption determines that the encrypted sub-random numbers $r_j$ can only be obtained by means of a decryption operation after delay for a period of time; and S104, at the second time point $t_n$, decrypting the delayed encryption results to obtain decrypted data of all the delayed encryption results, the decrypted data being for all of the sub-random number $r_j$, and performing operation on all of the sub-random number $r_j$ to obtain the random number X, wherein the random number X is a final available public random number.

In some embodiments, the S103 further comprises storing a digital fingerprint of the sub-random number $r_j$ on the blockchain. The digital fingerprint of the sub-random number is used instead of the sub-random number, which is usually a hash value of the sub-random number, so that the security of the sub-random number itself is further improved and the probability of an untrusted node obtaining the sub-random number is reduced.

In some embodiments, the operation in S104 is an operation solvable in polynomial time. Here, the operation solvable in polynomial time typically is yet not limited to an exclusive or operation.

In some embodiments, the S104 further comprises publishing all of the sub-random number $r_j$ at the second time point $t_n$ such that the N trusted nodes check all of the sub-random number $r_j$.

In some embodiments, the S104 further comprises decrypting all of the delayed encryption results in the m-th block in response to occurrence of a specific event, and performing operation on all of the resulting sub-random number $r_j$ to obtain the random number X, wherein the specific event comprises at least one of when a certain transaction occurs and when a certain specific time arrives.

In some embodiments, the S104 further comprises publicly releasing all of the sub-random number $r_j$ by the N trusted nodes in a timely and accurate manner without decrypting the delayed encryption results at the second time point $t_n$, thereby an reducing excessive requirement by decryption after delayed encryption on a processing power of a processor.

In some embodiments, the method further comprises testing block generating behavior by all nodes within the node group G so that a trustworthy degree of the nodes can be identified prior to implementation of the method, thereby ensuring a trustworthy degree of the generated random number X.

In some embodiments, the generation process of the random number X can be reversely verified when necessary based on a correspondence between a numerical value of the random number X and the N trusted nodes generating the random number X.

In another aspect of the present disclosure, provided is a public random number generation device based on a blockchain, comprising a blockchain and a processor, wherein the blockchain ensures that information published thereon is tamper-proof, and the processor is configured to: select a node group G, wherein the node group G contains N trusted nodes; determine a first time point $t_m$ and a second time point $t_n$, wherein the first time point $t_m$ is earlier than the second time point $t_n$, the first time point $t_m$ is a generation time point of an m-th block, the second time point $t_n$ is a generation time point of an n-th block, and the m-th block is fixed and cannot be tampered at the second time point $t_n$; at the first time point $t_m$, enable each of the N trusted nodes to separately generate a sub-random number $r_j$, wherein j=1, 2, . . . , N, perform delayed encryption on the sub-random number $r_j$, and place delayed encryption results in the m-th block, wherein the sub-random number $r_j$ is a component forming a random number X, and the delayed encryption determines that the encrypted sub-random numbers $r_j$ can only be obtained by means of a decryption operation after delay for a period of time; and at the second time point $t_n$, decrypt the delayed encryption results to obtain decrypted data of all the delayed encryption results, the decrypted data being for all of the sub-random number $r_j$, and perform operation on all the sub-random numbers $r_j$ to obtain the random number X, wherein the random number X is a final available public random number.

In some embodiments, the processor is further configured to store a digital fingerprint of the sub-random number $r_j$ on the blockchain.

In some embodiments, the operation is an operation solvable in polynomial time, for example, an exclusive or operation.

In some embodiments, the processor is further configured to publish all of the sub-random number $r_j$ at the second time point $t_n$ such that the N trusted nodes check all of the sub-random number $r_j$.

In some embodiments, the processor is further configured to decrypt all of the delayed encryption results in the m-th block in response to occurrence of a specific event and perform operation on all of the resulting sub-random number $r_j$ to obtain the random number X, wherein the specific event comprises at least one of when a certain transaction occurs and when a certain specific time arrives.

In some embodiments, the processor is further configured to publicly release all of the sub-random number $r_j$ by the N trusted nodes in a timely and accurate manner without decrypting the delayed encryption results at the second time point $t_n$, thereby reducing an excessive requirement by decryption after delayed encryption on a processing power of the processor.

In some embodiments, the processor is further configured to test block generating behavior by all nodes within the node group G so that a trustworthy degree of the nodes can be identified prior to operation of the device, thereby ensuring a trustworthy degree of the generated random number X.

In some embodiments, the generation process of the random number X can be reversely verified when necessary based on a correspondence between a numerical value of the random number X and the N trusted nodes generating the random number X.

In yet another aspect of the present disclosure, provided is a machine-readable storage medium having stored a computer program thereon, wherein the computer program, when executed by a processor, implements the public random number generation method based on a blockchain as described above.

Compared with the prior art, the beneficial effects of the present disclosure are as follows: the public random number generation method and device based on a blockchain forms a basic architecture of a distributed random oracle machine, so that a trusted random number can be generated in a distributed manner. Thus, it can be used to get rid of dependence on centralized institutions, for example, in areas such as gambling. The user can ensure that the final result is completely random, thereby greatly improving the transparency and credibility of the operation and further increasing the user's enthusiasm for the application based on blockchain. In addition, the use of the distributed oracle machine in the generation of new blocks in the blockchain can effectively reduce the waste of computing resources by existing PoW algorithms.

BRIEF DESCRIPTION OF THE DRAWINGS

The novel features of the present invention are set forth in detail in the appended claims. A better understanding of the features and advantages of the present invention will be obtained by reference to the following detailed description and accompanying drawings in which illustrative embodiments utilizing the principles of the present invention are set forth. The drawings are only for the purpose of illustrating the embodiments and should not be considered as limiting the invention. And throughout the drawings, like reference numerals denote like elements, in which:

DETAILED DESCRIPTION OF THE INVENTION

Exemplary embodiments of the present disclosure will be described in more detail below with reference to the accompanying drawings. While exemplary embodiments of the present disclosure are shown in the accompanying drawings, it should be understood that the present disclosure may be implemented in various forms and should not be limited by the embodiments set forth herein. Rather, these embodiments are provided to enable a more thorough understanding of the disclosure and to convey the scope of the present disclosure to those skilled in the art in its entirety. Nothing in the following detailed description is intended to indicate that any particular component, feature, or step is essential to the invention. Those skilled in the art will appreciate that various features or steps may be substituted for or combined with each other without departing from the present disclosure.

A blockchain applied in this embodiment is composed of a series of blocks at any time. In other words, the format of a public chain is composed of a series of numerical blocks. Those skilled in the art will appreciate that the number of blocks may be defined using the number of blocks in any manner known in the art or known in the future, such as several millions or even more, and the present invention is not limited in this respect.

Figure 1:
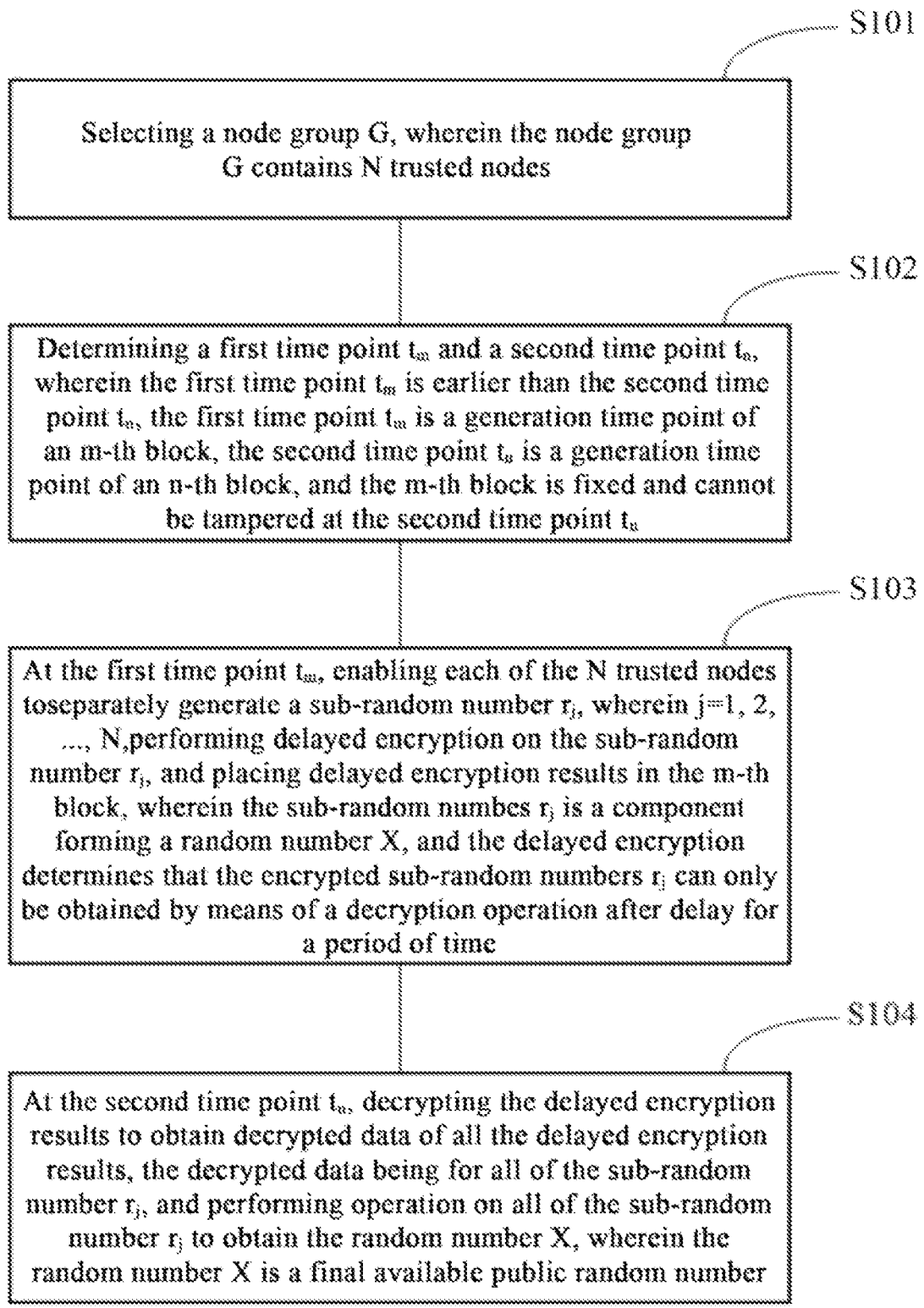
FIG. 1 illustrates a flowchart of a public random number generation method based on a blockchain according to an exemplary embodiment of the present disclosure.

FIG. 1 illustrates a public random number generation method based on a blockchain according to an exemplary embodiment of the present disclosure. As shown in FIG. 1, a flowchart of the method includes: S101, selecting a node group G, wherein the node group G contains N trusted nodes. According to the law of large numbers and the assumption of the basic architecture of blockchain, when the number of nodes in the node group G is large enough, there must be some trusted nodes; S102, determining a first time point $t_m$ and a second time point $t_n$, wherein the first time point $t_m$ is earlier than the second time point $t_n$, the first time point $t_m$ is a generation time point of an m-th block, the second time point $t_n$ is a generation time point of an n-th block, and the m-th block is fixed and cannot be tampered at the second time point $t_n$; S103, at the first time point $t_m$, enabling each of the N trusted nodes to separately generate a sub-random number $r_j$, wherein j=1, 2, . . . , N, performing delayed encryption on the sub-random number $r_j$, and placing delayed encryption results in the m-th block, wherein the sub-random number $r_j$ is a component forming a random number X, and the delayed encryption determines that the encrypted sub-random numbers $r_j$ can only be obtained by means of a decryption operation after delay for a period of time. The delayed encryption technology does not limit on the qualification of the decrypting party, but according to the design of the delayed encryption technology, the decryption result can be obtained only at this time point. The decryption result cannot be obtained in advance, and no further time delay can occur; and S104, at the second time point $t_n$, decrypting the delayed encryption results to obtain decrypted data of all the delayed encryption results, the decrypted data being for all of the sub-random number $r_j$, and performing operation on all of the sub-random number $r_j$ to obtain the random number X, wherein the random number X is a final available public random number. According to the numerical value of the random number X, the generator and the generation method of subsequent blocks in the blockchain can be determined.

Figure 2:
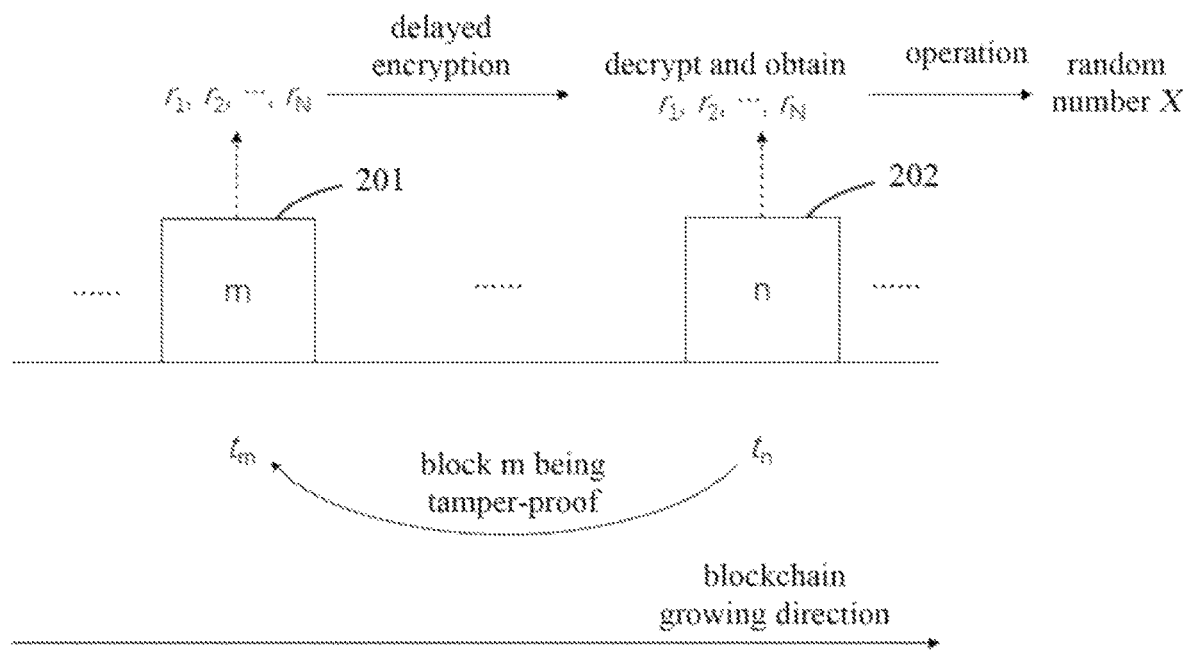
FIG. 2 illustrates a timing logic diagram of one example of a public random number generation method based on a blockchain according to an exemplary embodiment of the present disclosure.

FIG. 2 illustrates a timing logic diagram of one example of a public random number generation method based on a blockchain according to an exemplary embodiment of the present disclosure. As shown in FIG. 2, there are an m-th block 201 generated at the first time point $t_m$ and an n-th block 202 generated at the second time point $t_n$ in the blockchain growing direction, and the m-th block 201 is fixed and cannot be tampered at the second time point $t_n$. As shown in FIG. 2, at the first time point $t_m$, each of the N trusted nodes separately generates a sub-random number $r_j$, where j=1, 2 . . . N, delayed encryption is performed on the sub-random number $r_j$ and a delayed encryption result is placed in the m-th block 201. At the second time point $t_n$, after delay for a period of time, the delayed encryption result is decrypted to obtain decrypted data of all the delayed encryption result, the decrypted data being for all of the sub-random number $r_j$, and operation is performed on all of the sub-random number $r_j$ to obtain the random number X, where the random number X is a final available public random number.

Of course, in some embodiments, S103 also includes storing a digital fingerprint of the sub-random number $r_j$ on the blockchain. In one exemplary embodiment, the sub-random number $r_j$ may publish the hash operation value of the sub-random number $r_j$ as a digital fingerprint at a time prior to the second time point $t_n$ in the blockchain. Those skilled in the art should be aware that there are other forms of digital fingerprints that can be used for publication on the blockchain.

In some embodiments, the operation of S104 is an exclusive or operation. Of course, all forms of operation solvable in polynomial time capable of determining the final available public random numbers are within the protection scope of the present invention as long as they can be known and used by those skilled in the art.

In some embodiments, the S104 further includes publishing all of the sub-random number $r_j$ at the second point in time $t_n$ such that the N trusted nodes check all of the sub-random number $r_j$. This check is usually performed by a sub-random number generated by the trusted node generating sub-random numbers for itself. However, it is not certainly necessary to adopt this method, and it is also possible to enable each trusted node to check the sub-random numbers generated by other trusted nodes by means of network-wide broadcasting, and increase the accuracy of check by means of voting.

In some embodiments, the block generating behavior by all nodes within the node group G may be tested so that a trustworthy degree of the nodes can be identified before the method is implemented, thereby ensuring a trustworthy degree of the generated random number X.

In some embodiments, the S104 further includes decrypting all of the delayed encryption results in the m-th block in response to occurrence of a specific event, and performing operation on all of the resulting sub-random number $r_j$ to obtain the random number X, wherein the specific event comprises at least one of: when a certain transaction occurs and when a certain specific time arrives. A person skilled in the art can define the specific event in any reasonable way according to an actual application scenario.

Figure 3:
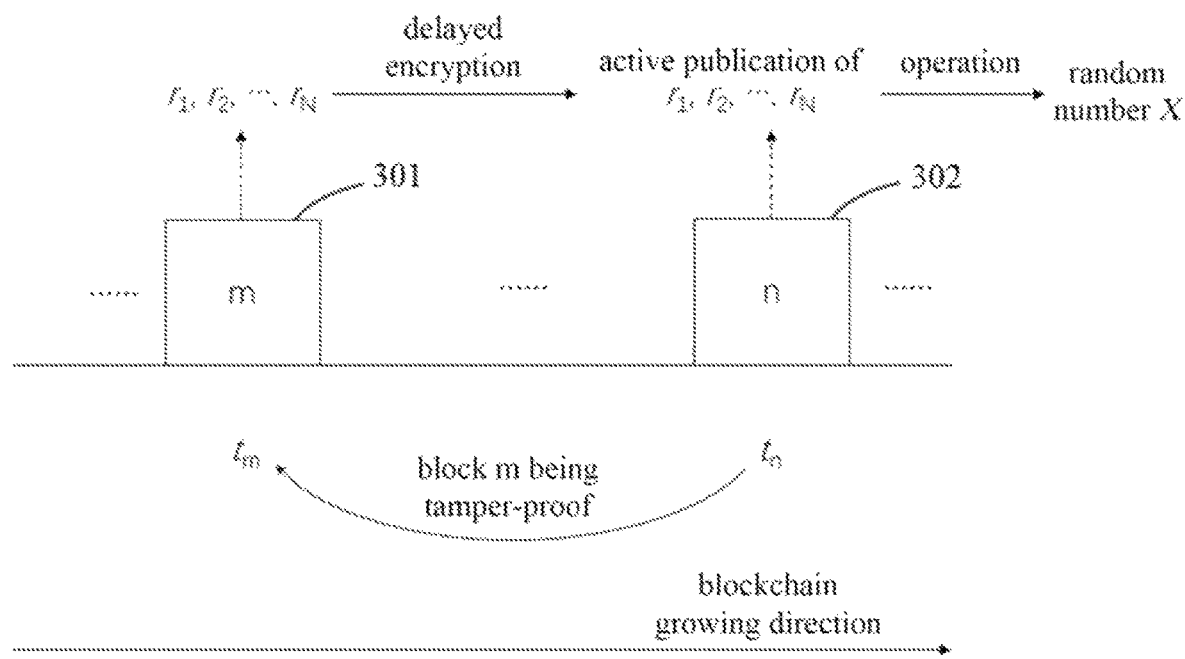
FIG. 3 illustrates a variation of a timing logic diagram of one example of the public random number generation method based on a blockchain according to the exemplary embodiment of FIG. 2 of the present disclosure.

FIG. 3 illustrates a variation of a timing logic diagram of one example of the public random number generation method based on a blockchain according to the exemplary embodiment of FIG. 2 of the present disclosure. In some embodiments, S104 is changed as shown in FIG. 3. Similar to the above description of FIG. 2, there are an m-th block 301 generated at the first time point $t_m$ and an n-th block 302 generated at the second time point to in the blockchain growing direction, and the m-th block 301 is fixed and cannot be tampered at the second time point $t_n$. As shown in FIG. 3, at the first time point $t_m$, each of the N trusted nodes separately generates a sub-random number $r_j$, where j=1, 2 . . . N, delayed encryption is performed on the sub-random number $r_j$ and a delayed encryption result is placed in the m-th block 301. However, unlike FIG. 2, as shown in FIG. 3, all of the sub-random number $r_j$ is publicly released by the N trusted nodes in a timely and accurate manner without decrypting the delayed encryption results at the second time point $t_n$, thereby reducing an excessive requirement by decryption after delayed encryption on a processing power of a processor. Then, operation is performed on all of the public sub-random number $r_j$ to obtain a random number X, where the random number X is the final available public random number. In addition, a manner of publication may include active publication and passive publication, wherein active publication is a behavior that is well known in the art and can be automatically published by a trusted node according to a schedule, and passive publication refers to publication by other nodes "delegated" by trusted nodes or publication in the form of bulletin boards under the occasion that the network is delayed or blocked, etc.

The advantage of the variation shown in FIG. 3 is that, cracking a delayed encryption requires multiple asymmetric decryptions (the number of which is related to the number or proportion of the asymmetric encryption), which requires relatively expensive computing resources. Therefore, if possible, the operator highly desires to avoid the decryption operation described above. However, if a node A that creates the delayed encryption of the random number X publicly tells the world X (for example, by make publication in a known space), other nodes can read X directly without the need for decryption. But this cannot be allowed in terms of security. At the same time, this also means that there are two options for obtaining X by a second node B. That is, the node B may obtain X directly from A (if the node A has released the random number X), or obtain X by cracking the delayed encryption (if the node A has not released the random number X). Importantly, A cannot select the actual value seen by B at the last moment because this can compromise security. Therefore, the most efficient check is that A must commit an X hash to the blockchain at the same time of delaying encryption or at an earlier time. Then, regardless of how B obtains value X, A will perform hash on X and compares it to a commitment.

From a security perspective, the only way B can obtain X is to obtain X by cracking the delayed encryption (which must have a limitation in the blockchain so that it can be immutable early enough, just like in multi-stage protocols), but it appears to be much less efficient.

In some implementations, the method allows for testing block generating behavior by nodes so that the trustworthy degree of the nodes can be identified prior to implementation of the method, thereby ensuring the trustworthy degree after generation of the public random number X. The testing method includes: 1) transfers, which are made to single/multi-signature addresses, and to scripts; 2) double spend attack tests, which are necessary if there are modifications to the mechanism of the digital currency (e.g., Bitcoin); 3) tests on function and safety of smart contracts; and 4) packing and transaction confirmation efficiency. The tests on nodes include: 1) pressure tests; 2) chain forking tests; 3) checks on files dropped to disk; and 4) block generation time statistics. Of course, those skilled in the art may perform other well-defined tests on whether a node is trustworthy or not depending on the type of blockchain.

In some embodiments, the generation process of the random number X can be reversely verified when necessary based on a correspondence between a numerical value of the random number X and the N trusted nodes generating the random number X. This correspondence can be designed for subsequent blockchain traceability and other applications, so that the generation process of the random number X can be reversely verified when necessary. This is a design for hidden verification, which is a relatively practical solution for some applications with high security requirements. A correspondence exists between the numerical value and the generation process of the random number X and the N trusted nodes, so that a reverse verification can be performed when necessary. This property is referred to as the public verifiability of the random number X. For each independent random number X generation process, the numerical value and generation process of the random number can be explicitly confirmed and reversely verified.

In some blockchains, it is expected that the blocks will appear in strict accordance with the schedule, so that when the blocks will appear can be known in advance. For example, this can basically be ensured by a hash clock. Any occurring blocks are marked with a time, e.g. time T1, T2, T3, T4, etc., and typically each block has such a time representation. The time representation is very close to the time when the block actually occurs, so that a schedule for the random oracle machine to generate the random number X can be arranged to release a random number shortly before the time representation or at a time point corresponding to the time representation. These random numbers X are explicitly or implicitly marked as the same time series as the time representation. Therefore, it is possible to associate the block and its timestamp with the numerical value of the random number and its publication time. If one or more time representations $T_i$ are lost for some reason, such as a discarded branch, then the random numbers corresponding to the time representations $T_i$ will also be discarded.

In fact, in a blockchain in which strict block generation scheduling is expected, there is a clear correspondence between the numerical value of the random number X generated by the random oracle machine and the block. This is because in a blockchain with a dead fork, it will be problematic in attempting to align a block index with a specific number.

The implementation principle of the method is as follows: (1) if a segment is random, the whole is independently random, that is, if the node group G is guaranteed to be random, since the trusted nodes participating in the blockchain predominate and the number of nodes in the node group G is large, it will be guaranteed that at least one $r_j$ is randomly generated and submitted by the trusted node, so as to ensure that the final generated X is random; and (2) any node may affect the final value, but cannot affect the distribution of the final X, because the contributions of other nodes are not visible to the node when the contribution of the node itself is fixed. By assumption, one of these other nodes will randomize the value. It should be understood that this assumption is based on the premise that the node group G is selected to be large enough.

Figure 4:
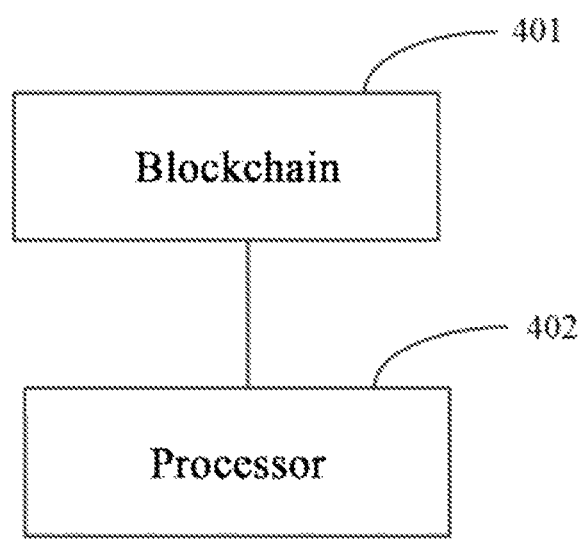
FIG. 4 illustrates a schematic structural diagram of a public random number generation device based on a blockchain according to an exemplary embodiment of the present disclosure.

FIG. 4 illustrates a schematic structural diagram of a public random number generation device based on a blockchain according to an exemplary embodiment of the present disclosure. As shown in FIG. 4, the public random number generation device based on a blockchain includes a blockchain 401 and a processor 402, wherein the blockchain 401 is capable of ensuring that information published thereon is tamper-proof. It is well known that the blockchain is a chained data structure formed by connecting data in chronological order in a series of blocks, and is also a tamper-proof and unforgeable distributed ledger that cryptographically guarantees data. Blockchain uses cryptography such as hash and signature and consensus algorithm to build trust mechanism, which makes the cost of repudiation, tampering and fraud huge and ensures data to be tamper-proof and unforgeable. It may be realized that the blockchain may be implemented in any manner known in the art or known in the future, such as Bitcoin, Ethereum, etc. The processor 402 may be configured to: select a sufficiently large node group G, wherein the node group G contains N trusted nodes. According to the law of large numbers and the assumption of the basic architecture of blockchain, when the number of node groups G is large enough, there must be some trusted nodes. In the present exemplary embodiment, the node group G is a set composed of trusted nodes, the set of nodes has j nodes, and the sub-random number $r_j$ is a component forming the random number X; determine a first time point $t_m$ and a second time point $t_n$, wherein the first time point $t_m$ is earlier than the second time point $t_n$, the first time point $t_m$ is a generation time point of an m-th block, the second time point $t_n$ is a generation time point of an n-th block, and the m-th block is fixed and cannot be tampered at the second time point $t_n$; at the first time point $t_m$, enable each of the N trusted nodes to separately generate a sub-random number $r_j$, wherein j=1, 2, . . . , N, perform delayed encryption on the sub-random number $r_j$, and place delayed encryption results in the m-th block, wherein the sub-random number $r_j$ is a component forming a random number X, and the delayed encryption determines that the encrypted sub-random numbers $r_j$ can only be obtained by means of a decryption operation after delay for a period of time. The delayed encryption technology does not limit on the qualification of the decrypting party, but according to the design of the delayed encryption technology, the decryption result can be obtained only at this time point. The decryption result cannot be obtained in advance, and no further time delay can occur; and at the second time point $t_n$, decrypt the delayed encryption result to obtain all of the sub-random number $r_j$, and perform operation on all of the sub-random number $r_j$ to obtain the random number X, wherein the random number X is a final available public random number.

In yet another aspect of the present disclosure, there is further provided a machine-readable storage medium on which a computer program is stored, wherein the computer program, when executed by a processor, implements the public random number generation method based on a blockchain as described above. In some embodiments, the machine-readable storage medium is a tangible component of a digital processing device. In other embodiments, the machine-readable storage medium is optionally removable from a digital processing device. In some embodiments, by way of non-limiting example, the machine-readable storage medium may include a USB disk, a removable hard disk, a read-only memory (ROM), a random access memory (RAM), a flash memory, a programmable read-only memory (PROM), an erasable programmable read-only memory (EPROM), a solid state memory, a magnetic disk, an optical disk, a cloud computing system or a service, or the like.

It should be understood that the steps described in the method embodiment of the present disclosure may be performed in a different order and/or in parallel. Further, the method embodiment may include additional steps and/or omit the steps shown in implementation. The scope of the invention is not limited in this respect.

A number of specific details are described in the specification provided herein. However, it should be understood that embodiments of the present disclosure may be practiced without these specific details. In some embodiments, well-known methods, structures, and techniques are not shown in detail so as not to obscure the understanding of this specification.

Although exemplary embodiments of the present invention have been shown and described herein, it will be readily understood by those skilled in the art that such embodiments are provided by way of example only. Many modifications, changes and alternatives will now occur to those skilled in the art without departing from the invention. It should be understood that various alternatives to the embodiments of the invention described herein may be employed in the practice of the invention. The following claims are intended to limit the scope of the invention and thus cover the methods and structures within the scope of these claims and their equivalents.

What is claimed is:

1. A public random number generation method based on a blockchain, comprising the following steps:
   a selection step of selecting a node group G, wherein the node group G contains N trusted nodes;
   a determination step of determining a first time point $t_m$ and a second time point $t_n$, wherein the first time point $t_m$ is earlier than the second time point $t_n$, the first time point $t_m$ is a generation time point of an m-th block, the second time point $t_n$ is a generation time point of an n-th block, and the m-th block is fixed and cannot be tampered at the second time point $t_n$;
   a generation step of, at the first time point $t_m$, enabling each of the N trusted nodes to separately generate a sub-random number $r_j$, wherein j=1, 2, . . . , N, performing delayed encryption on the sub-random number $r_j$, and placing delayed encryption results in the m-th block, wherein the sub-random number $r_j$ is a component forming a random number X, and the delayed encryption determines that the encrypted sub-random numbers $r_j$ can only be obtained by means of a decryption operation after delay for a period of time; and
   a decryption step of, at the second time point $t_n$, decrypting the delayed encryption results to obtain decrypted data of all the delayed encryption results, the decrypted data being for all of the sub-random number $r_j$, and performing an operation solvable in polynomial time on all of the sub-random number $r_j$ to obtain the random number X, wherein the random number X is a final available public random number.

2. The public random number generation method of claim 1, wherein the generation step further comprises storing a digital fingerprint of the sub-random number $r_j$ on the blockchain.

3. The public random number generation method of claim 1, wherein the decryption step further comprises publishing all of the sub-random number $r_j$ at the second time point $t_n$ such that the N trusted nodes check all of the sub-random number $r_j$.

4. The public random number generation method of claim 1, wherein the decryption step further comprises decrypting all of the delayed encryption results in the m-th block in response to occurrence of a specific event, and performing operation on all of the resulting sub-random number $r_j$ to obtain the random number X, wherein the specific event comprises at least one of: when a certain transaction occurs and when a certain specific time arrives.

5. The public random number generation method of claim 1, further comprises testing block generating behavior by all nodes within the node group G so that a trustworthy degree of all nodes within the node group G can be identified, thereby ensuring a trustworthy degree of the random number X.

6. The public random number generation method of claim 1, wherein a generation process of the random number X can be reversely verified based on a correspondence between a numerical value of the random number X and the N trusted nodes generating the random number X.

7. A public random number generation device based on a blockchain, comprising the blockchain and a hardware processor, wherein the blockchain ensures that information published thereon is tamper-proof, and the hardware processor is configured to:
select a node group G, wherein the node group G contains N trusted nodes;
determine a first time point $t_m$ and a second time point $t_n$, wherein the first time point $t_m$ is earlier than the second time point $t_n$, the first time point $t_m$ is a generation time point of an m-th block, the second time point $t_n$ is a generation time point of an n-th block, and the m-th block is fixed and cannot be tampered at the second time point $t_n$;
at the first time point $t_m$, enable each of the N trusted nodes to separately generate a sub-random number $r_j$, wherein j=1, 2, . . . , N, perform delayed encryption on the sub-random number $r_j$, and place delayed encryption results in the m-th block, wherein the sub-random number $r_j$ is a component forming a random number X, and the delayed encryption determines that the encrypted sub-random numbers $r_j$ can only be obtained by means of a decryption operation after delay for a period of time; and
at the second time point $t_n$, decrypt the delayed encryption results to obtain decrypted data of all the delayed encryption results, the decrypted data being for all of the sub-random number $r_j$, and perform an operation solvable in polynomial time on all of the sub-random number $r_j$ to obtain the random number X, wherein the random number X is a final available public random number.

8. The public random number generation device of claim 5, wherein the hardware processor is further configured to store a digital fingerprint of the sub-random number $r_j$ on the blockchain.

9. The public random number generation device of claim 5, wherein the hardware processor is further configured to publish all of the sub-random number $r_j$ at the second time point $t_n$ such that the N trusted nodes check all of the sub-random number $r_j$.

10. The public random number generation device of claim 5, wherein the hardware processor is further configured to decrypt all of the delayed encryption results in the m-th block in response to occurrence of a specific event, and perform operation on all of the resulting sub-random number $r_j$ to obtain the random number X, wherein the specific event comprises at least one of: when a certain transaction occurs and when a certain specific time arrives.

11. The public random number generation device of claim 5, wherein the hardware processor is further configured to test block generating behavior by all nodes within the node group G so that a trustworthy degree of the all nodes within the node group G can be identified, thereby ensuring a trustworthy degree of the random number X.

12. The public random number generation device of claim 5, wherein a generation process of the random number X can be reversely verified based on a correspondence between a numerical value of the random number X and the N trusted nodes generating the random number X.

13. A non-transitory machine-readable storage medium having stored a computer program thereon, wherein the computer program, when executed by a processor, implements the following steps:
a selection step of selecting a node group G, wherein the node group G contains N trusted nodes:
a determination step of determining a first time point $t_m$ and a second time point $t_n$, wherein the first time point $t_m$ is earlier than the second time point $t_n$, the first time point $t_m$ is a generation time point of an m-th block, the second time point $t_n$ is a generation time point of an n-th block, and the m-th block is fixed and cannot be tampered at the second time point $t_n$;
a generation step of at the first time point $t_m$, enabling each of the N trusted nodes to separately generate a sub-random number $r_j$, wherein j=1, 2, . . . N, performing delayed encryption on the sub-random number $r_j$, and placing delayed encryption results in the m-th block, wherein the sub-random number $r_j$ is a component forming a random number X, and the delayed encryption determines that the encrypted sub-random numbers $r_j$ can only be obtained by means of a decryption operation after delay for a period of time; and
a decryption step of at the second time point $t_n$, decrypting the delayed encryption results to obtain decrypted data of all the delayed encryption results, the decrypted data being for all the sub-random number $r_j$, and performing an operation solvable in polynomial time on all of the sub-random number $r_j$ to obtain the random number X, wherein the random number X is a final available public random number.

14. The non-transitory machine-readable storage medium of claim 13, wherein the generation step further comprises storing a digital fingerprint of the sub-random number $r_j$ on a blockchain.

15. The non-transitory machine-readable storage medium of claim 13, wherein the decryption step further comprises publishing all of the sub-random number $r_j$ at the second time point $t_n$ such that the N trusted nodes check all of the sub-random number $r_j$.

16. The non-transitory machine-readable storage medium of claim 13, wherein the decryption step further comprises decrypting all of the delayed encryption results in the m-th block in response to occurrence of a specific event, and performing operation on all of the resulting sub-random number $r_j$ to obtain the random number X, wherein the specific event comprises at least one of: when a certain transaction occurs and when a certain specific time arrives.

17. The non-transitory machine-readable storage medium of claim 13, wherein the computer program further implements testing block generating behavior by all nodes within the node group G so that a trustworthy degree of the all nodes within the node group G can be identified, thereby ensuring a trustworthy degree of the random number X.

18. The non-transitory machine-readable storage medium of claim 13, wherein a generation process of the random number X can be reversely verified based on a correspondence between a numerical value of the random number X and the N trusted nodes generating the random number X.

* * * * *